United States Patent
Anderson et al.

(10) Patent No.: US 7,260,411 B2
(45) Date of Patent: *Aug. 21, 2007

(54) AIDING BEAM IDENTIFICATION IN A SATELLITE SYSTEM

(75) Inventors: Jon J. Anderson, Boulder, CO (US); Jin Dai, San Diego, CA (US); Francis M. Ngai, Louisville, CO (US); Edward B. Victor, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/297,557

(22) Filed: Dec. 7, 2005

(65) Prior Publication Data

US 2006/0099910 A1    May 11, 2006

Related U.S. Application Data

(63) Continuation of application No. 10/278,502, filed on Oct. 22, 2002, now Pat. No. 7,092,725.

(60) Provisional application No. 60/342,925, filed on Oct. 25, 2001.

(51) Int. Cl.
    H04Q 7/20    (2006.01)

(52) U.S. Cl. .................. 455/456.6; 455/427; 455/12.1; 455/67.11

(58) Field of Classification Search ............. 455/456.6, 455/456.1, 427, 12.1, 13.2, 9, 11.1, 436, 440, 455/18, 517, 502, 67.11, 67.16, 430, 437, 455/13.1, 446, 456.3; 370/324, 335, 342
See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,267,261 A | | 11/1993 | Blakeney, II et al. |
| 5,543,813 A | | 8/1996 | Araki et al. |
| 5,552,795 A | | 9/1996 | Tayloe et al. |
| 5,644,572 A | * | 7/1997 | Olds et al. .................. 455/13.2 |
| 5,805,648 A | | 9/1998 | Sutton |
| 5,991,598 A | | 11/1999 | Nawata et al. |
| 6,072,428 A | | 6/2000 | Schipper et al. |
| 6,137,441 A | | 10/2000 | Dai et al. |
| 6,317,453 B1 | * | 11/2001 | Chang .......................... 455/446 |
| 6,785,553 B2 | | 8/2004 | Chang et al. |
| 6,813,257 B1 | | 11/2004 | Emmons et al. |

\* cited by examiner

*Primary Examiner*—Edward F. Urban
*Assistant Examiner*—John J. Lee
(74) *Attorney, Agent, or Firm*—Thomas Rouse; Ashish Patel (57) ABSTRACT

A system and method for determining timing offset errors in a low earth orbit satellite system based upon Doppler and Doppler rate of change is provided. A user terminal determines first and second timing offsets respectively associated with first and second satellite beams from respective first and second satellites. Next, the user terminal determines the Doppler and Doppler rate of change associated with the first and second satellite beams. A timing offset is estimated from the measured Doppler and Doppler rate of change and is then compared with the user terminal's own determined timing offset. If the comparison does not produce a value within a predetermined threshold, a beam identification error is declared.

11 Claims, 11 Drawing Sheets

AIDING BEAM IDENTIFICATION IN A SATELLITE SYSTEM

CLAIM OF PRIORITY UNDER 35 U.S.C. §120

The present Application for Patent is a Continuation and claims priority to U.S. patent application Ser. No. 10/278,502 entitled "AIDING BEAM IDENTIFICATION IN A SATELLITE SYSTEM" filed Oct. 22, 2002, now U.S. Pat. No. 7,092,725 now allowed, which application claims priority from U.S. Provisional Patent Application entitled "Method and System for Aiding Beam Identification In A LEO Satellite System," U.S. Provisional Application No. 60/342,925, filed Oct. 25, 2001, both of which are assigned to the assignee hereof and are hereby expressly incorporated by reference herein.

BACKGROUND

1. Field

The present invention relates generally to satellite communications and satellite communications systems. More particularly, the present invention relates to estimating and compensating for propagation delays associated with identifying satellite beams in a satellite communications network.

2. Background

Conventional satellite communications systems include one or more terrestrial base stations (hereinafter referred to as gateways), user terminals, such as a mobile phone, and one or more satellites for relaying communications signals between the user terminal and the gateway. The gateway receives signals from and transmits signals to satellites, which could be in orbiting low earth orbit (LEO), processes communication links or calls, and interconnects or transfers calls to and from appropriate ground networks, as desired. That is, the gateway provides an Earth-based link to permit a system user to communicate with other system users or to provide communication links to ground-based service providers, such as publicly-switched telephone networks (PSTNs), data networks, wireless communication systems, or other satellite gateways.

Although mobile phones or wireless user terminals provide users with increased mobility and flexibility, the proliferation of such phones have increased the demands on the associated communications systems. For example, in the case of satellite-based communication systems, determining the position of system users is critically important in establishing communication links with the phone, determining what service provider to use, and providing position location services to the phone user, among other things. However, the flexibility of travel for mobile phones complicates this process.

Most communication satellites project a "footprint" comprising several radio link or communication signal beams grouped to provide coverage for communications with system users in a geographic area covered by the footprint. A particular user terminal may be assigned, albeit temporarily, to use a specific satellite beam for transferring communication signals based upon that user terminal's geographic location. Consequently, a satellite communication system gateway must know the user terminal position in order to provide appropriate communication services to a particular user through an appropriate servicing satellite beam. Thus, knowledge of the specific satellite beam providing service for a particular user or geographical area is basic to the ability of a gateway to provide communication services.

Another aspect of this process is properly establishing a communications link to the other communication services providers, such as the PSTNs and the data networks. These service providers are usually associated with specific Earth-based geographic areas and only process communications links associated with their respective areas. For example, networks may have governmental licenses or various business arrangements with customers to service particular areas. Knowledge of the user terminal position is also needed before these geographically dependent services can be provided. Identification of the satellite beam is a necessary step in determining the position of a user terminal.

A number of conventional approaches are available for determining the position of satellite communication system users. Some techniques, for example, entail measuring a distance between the user terminal and the associated satellites and determining rates of change associated with the determined distance. When these distance measurements are combined with other data, the location of the user terminal may be accurately determined. Techniques for determining user-terminal location using satellite user-terminal range and range rates are disclosed in U.S. Pat. No. 6,078,284, entitled "Passive Position Determination Using Two Low Earth Orbit Satellites;," U.S. Pat. No. 6,327,534, entitled "Unambiguous Position Determination Using Two Low-Earth Orbit Satellites;" and U.S. Pat. No. 6,107,959 entitled "Position Determination Using One Low-Earth Orbit Satellite." Furthermore, U.S. Pat. No. 6,137,441, titled "Accurate Range And Range Rate Determination In A Satellite Communications System," discloses a technique for compensating for satellite motion in order to enhance the accuracy of user-terminal position information.

However, although motion between satellites and associated user terminals can be determined, errors often occur in these measurements due to effects such as antenna gain characteristics or, for example, because a particular satellite may be low in elevation with respect to the user terminal. These errors often result in the gateway misidentifying the servicing or communicating satellite's beam and consequently mis-judging the position of the user terminal. The end result of misidentification of the satellite's beam is often denial of system services, or even complete radio link acquisition failure for the associated user.

Another source of errors may arise as part of the implementation of specific communication techniques or user access methods employed by communication systems to accommodate multiple system users. Numerous techniques exist for providing access to communication systems for multiple system users. Two known multiple-access techniques include time division multiple access (TDMA) and frequency division multiple access (FDMA), the basics of which are well-known in the art. However, spread spectrum modulation techniques, such as code division multiple access (CDMA), are significantly more desirable because of their ability to accommodate multiple users in increasingly bandwidth-limited environments.

The use of CDMA techniques in a multiple access communication system is disclosed in U.S. Pat. No. 4,901,307 titled "Spread Spectrum Multiple Access Communication System Using Satellite Or Terrestrial Repeaters," and. U.S. Pat. No. 5,103,459 entitled "System And Method For Generating Signal Waveforms In A CDMA Cellular Telephone System," both of which are assigned to the assignee of the present invention and are incorporated herein by reference. The method for providing CDMA mobile communications was standardized in the United States by the Telecommunications Industry Association in TIA/EIA/IS-95-A, entitled "Mobile Station-Base Station Compatibility Standard for Dual-Mode Wideband Spread Spectrum Cellular System," referred to herein as IS-95. Other communication systems or techniques are described in the IMT-2000/UM, or International Mobile Telecommunications System 2000/Universal Mobile Telecommunications System, standards covering what are referred to as wideband CDMA (WCDMA), cdma2000 (such as cdma2000 1× or 3× standards, for example) or TD-SCDMA.

In satellite communication systems that use CDMA, a large number of user terminal or phone users, each having a transceiver, communicate through satellites and gateways using spread spectrum communication signals. By using CDMA, the associated frequency spectrum can be reused multiple times, thus permitting an increase in system user capacity. Thus, CDMA is much more spectrally efficient than other user-access techniques. Although CDMA is spectrally efficient, CDMA systems are also somewhat vulnerable to problems associated with the mobile station or terminal mis-positioning errors discussed above. One area where CDMA systems are particularly vulnerable is the area of user handoffs.

A handoff occurs when a mobile station communications session or link, such as an ongoing call or conversation, is passed from one satellite beam to another satellite beam. There are generally two types of handoffs, hard handoffs and soft handoffs. During a hard handoff, when a mobile station moves from within the coverage area of one beam to the coverage area of another, destination or target, beam that is going to provide service, the terminal breaks its communication link with the servicing beam and establishes a new communication link with the destination beam. During a soft handoff, however, the mobile station establishes a link with the destination beam prior to breaking its communication with the current beam. This process is known in the art as make-before-break. Additionally, during a soft handoff, the determination of the proper identification for the destination beam is made in relation to the location of the servicing beam. Thus, during a soft handoff, the mobile station simultaneously communicates with both a servicing beam and a destination beam.

A soft handoff technique is disclosed in U.S. Pat. No. 5,267,261 entitled "Mobile Station-Assisted Soft Handoff in a CDMA Cellular Communications System," which is assigned to the assignee of the present invention and is incorporated herein by reference. In the system of the '261 patent, the soft handoff process is predicated upon the use of measuring the strength of a pilot signal transmitted by each beam to facilitate access to the satellite by a particular mobile station. By way of background, access to a CDMA-based communication system or communication signals for mobile stations is provided in a forward link, that is, in the direction from the satellite to the mobile station. The forward link includes three types of overhead channels: at least one pilot channel, a synchronization channel, and one or more paging channels. These overhead channels are used by the system to establish and manage communication sessions with the mobile station.

The pilot channel includes transmission of a pilot signal which acts as a beacon for potential system users or subscribers, and is used by user terminals or mobile stations to obtain initial system synchronization and to provide robust time, frequency and phase tracking of the base station transmitted signals. In spread spectrum communication systems such as those based on IS-95, base stations are characterized or distinguished by a phase offset in the pseudo-random-noise (PN) codes used for spreading communication signals, also known as PN offset of the pilot signal. Typically, each terrestrial base-station uses the same spreading code at different code phase offsets. In the alternative, as is more typical of a satellite system, a series of PN codes based on unique PN polynomials are used within the communication system with different PN codes possibly being used for different gateways and for satellites in each orbital plane. It will be readily apparent to those skilled in the art that as many or as few PN codes as desired can be assigned to identify specific signal sources or repeaters in the communication system.

In a satellite based system, in order to determine the proper destination satellite beam, that is which beam is covering the location of the user terminal, from among a number of candidate beams, the user terminal searches for the appropriate pilot signal by determining the pilot signal strength and the PN code or code phase offset. This process is accomplished by performing a correlation operation for each potential code and code phase offset, wherein all received pilot signals are correlated to a particular set of PN code offset values. A method and apparatus for performing correlation operations is described in detail in U.S. Pat. No. 5,805,648, entitled "Method And Apparatus For Performing Search Acquisition In A CDMA Communication System," which is assigned to the assignee of the present invention and is incorporated herein by reference.

To initially establish a communications link with a communication system, a user terminal must first acquire a pilot signal associated with the system. The user terminal receives the PN code and phase offset information of this pilot signal when it demodulates the pilot signal and system timing by demodulating the synchronization channel. However, before the user terminal is handed off to a new satellite beam, it must correlate newly received pilot signals with the set of PN codes and code offset values to determine the PN offset of the most likely destination satellite beam.

The amount of propagation delay between communication system satellites and the user terminal is often significant and uncertain, and may cause unknown shifts in PN offset values being detected. That is, the user terminal detects a larger phase shift due to the delay rather than the originating signal source. These shifts may result in the user terminal misidentifying a new hand-off or destination satellite beam. Unknown propagation delays are especially probable when the new destination satellite is low on the horizon with respect to the current servicing satellite in the cited references.

What is needed, therefore, is a technique to compensate for the effects of propagation delays by permitting the user terminal to independently verify PN offset measurements associated with destination or new target satellites in a manner that estimates propagation delays.

SUMMARY

The present invention provides a system and method for independently verifying PN offset measurements. By using the Doppler and Doppler rate of change of a destination satellite, a range to the satellite can be estimated within a user terminal. By filtering these measurements, and using integer math, the user terminal can convert the Doppler measurements to a range estimate, which in turn can be converted to a PN offset estimate. This PN offset estimate may then be compared to the user terminal's measured PN offset value. If the PN offset estimate differs from a measured PN offset by more than a predetermined amount, an error may be noted or the measurements may be discarded.

Consistent with the principles of the present invention as embodied and broadly described herein, the invention includes a method to determine timing offset errors in a in a communications system such as a satellite system. The method comprises determining in a terminal a first timing offset associated with a first transmitter signal from a first transmitter such as a first beam from a first satellite. The method also includes determining in the terminal a second timing offset associated with a second transmitter signal from a second transmitter such as a second beam from a second satellite, based upon the first timing offset. A first range is estimated from the user terminal to the first transmitter or satellite and a second range is estimated from the user terminal to the second transmitter or satellite. Finally, an error between the difference in signal arrival times and the difference between the first and second ranges that were estimated, is determined.

In further aspects, estimating first and second ranges include respectively determining a Doppler frequency associated with the first and second satellite beams and a rate of change in the determined Doppler frequency.

A method is also provided to perform beam identification in a user terminal configured to communicate using a low earth orbit satellite system, the user terminal including a processor configured to receive a first satellite beam including a first timing offset from a servicing satellite, and facilitate a handoff from the first satellite beam to a second satellite beam, the second satellite beam being radiated from a destination satellite. The method comprises acquiring the second satellite beam in the user terminal, determining a second timing offset of the second satellite beam based upon the first timing offset; identifying the second satellite beam based upon the second timing offset estimating a first range from the user terminal to the servicing satellite; estimating a second range from the user terminal to the destination satellite; determining a timing difference based upon a difference between the estimated first range and the estimated second range; calculating a difference between the second timing offset and the timing difference; and confirming identification of the second satellite beam when the difference between the second timing offset and the timing difference is greater than a predetermined value.

An exemplary user terminal, constructed in accordance with the present invention, comprises a receiving module configured to receive and demodulate first and second transmitter signals associated with respective first and second transmitters, such as first and second satellite beam signals associated with respective first and second satellite beams. The first and second satellite beams are received from respective first and second satellites. The user terminal also includes a processor coupled to the receiving module. The processor is configured to (i) determine a first timing offset associated with the first transmitter or satellite beam signal, the first timing offset being representative of a first beam ID of the first satellite beam, (ii) determine a second timing offset associated with the second transmitter or satellite beam signal, the second timing offset being determined based upon the first timing offset and being representative of a second beam ID of the second satellite beam, and (iii) measure at the user terminal respective Doppler characteristics associated with the first and second satellite beam signals to respectively verify the first and second beam IDs.

The respective Doppler characteristics are used to determine first and second ranges respectively associated with the user terminal and each of the first and second satellites. Finally, the user terminal is adapted to convert the first and second ranges into a relative timing difference and determine the presence of error in the second beam ID based upon a comparison of this timing difference and the estimated range difference incorporating the beam IDs.

Features and advantages of the present invention include an ability to independently verify the user terminal's PN offset or beam ID measurement. This ability enhances the accuracy of identifying satellite beams, thus increasing the certainty of a user terminal gaining access to the communication system. Unknown propagation delays, which may result from low-horizon satellites and PN offset errors resulting therefrom, may be determined and compensated for. Therefore, the accuracy with which user terminals determine the satellite beam ID of destination satellite beams may be increased. Correspondingly, users may use the satellite communications system with increased assurance that the required system services will not be interrupted or altogether denied.

BRIEF DESCRIPTION OF THE DRAWINGS

The accompanying drawings, which are incorporated in and constitute a part of the specification, illustrate embodiments of the invention and, together with the description, explain the purpose, advantages, and principles of the invention. In the drawings.

DETAILED DESCRIPTION

The following detailed description of the present invention refers to the accompanying drawings that illustrate exemplary embodiments consistent with this invention. Other embodiments are possible, and modifications may be made to the embodiments from the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware, and/or the entities illustrated in the figures. Any actual software code with specialized controlled hardware to implement the embodiments is not limiting of the present invention. Thus, the operation and behavior of the present invention will be described with the understanding that modifications and variations of the embodiments are possible, given the level of detail presented herein.

Figure 1:
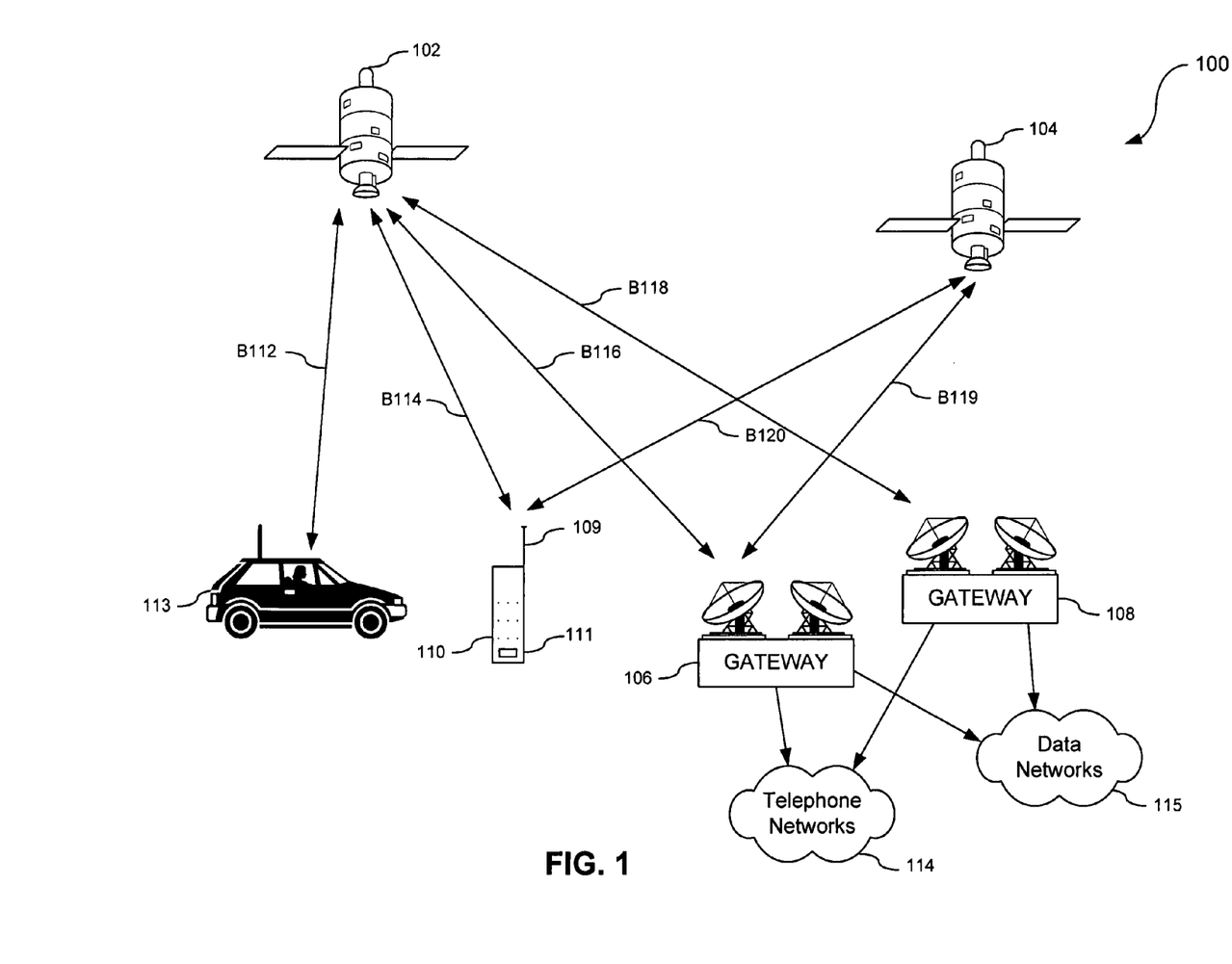
FIG. 1 is a system diagram illustrating a conventional low-Earth-orbit satellite communication system.

FIG. 1 illustrates an exemplary satellite communication system in which the present invention is useful. Although it is contemplated that this communication system uses CDMA communication protocols and signals, this is not required. In FIG. 1, an exemplary LEO satellite communication system includes respective first and second satellites 102 and 104. Also included are gateways 106 and 108 and a portable user terminal 110, including a communications unit 111 to transmit and receive signals through an antenna 109. Finally, a mobile user terminal 113 is provided. Gateways 106 and 108 process calls associated with the portable user terminal 110 and the mobile terminal 113 and provide communication links to telephone networks 114 and data networks 115. The satellites 102 and 104 transmit radio frequency signals, i.e., satellite beams, in order to provide communication links between the gateways 106 and 108 and user terminals 110 and 113. Specifically, the satellite 102 transmits satellite beams $B112_2$, $B114_2$, $B116_2$, and $B118_2$, and the satellite 104 transmits satellite beams $B119_4$, and $B120_4$.

In this example, user terminals 110 and 113 each have or include apparatus or a wireless communication device such as, but not limited to, a cellular telephone, wireless handset, a data transceiver, or a paging or position determination receiver. Furthermore each of user terminals can be hand-held, portable as in vehicle-mounted (including for example cars, trucks, boats, trains, and planes), or fixed, as desired. For example, FIG. 1 illustrates user terminal 110 as a hand-held device, and user terminal 113 as a portable vehicle-mounted device. Wireless communication devices are also sometimes referred to as mobile wireless terminals, user terminals, mobile wireless communication devices, subscriber units, mobile units, mobile stations, mobile radios, or simply "users," "mobiles," "terminals," or "subscribers" in some communication systems, depending on preference.

Generally, satellites provide multiple beams within "footprints" that are directed to cover separate generally non-overlapping geographic regions. Here, the satellite beams B112, B114, B116, and B118-B120 provide satellite coverage for different geographic areas in predefined patterns. Generally, multiple beams at different frequencies, which are referred to as CDMA channels, "sub-beams" or frequency division multiplexed (FDM) signals, frequency slots, or channels, may overlap the same geographic areas. One embodiment of the exemplary system 100 includes multiple satellites, traveling in different orbital planes at an elevation of about 1,400 kilometers for servicing a large number of user terminals. However, the present invention is not limited to such a configuration, and may be applicable to a variety of different satellite systems and gateway configurations, including other orbital elevations, distances, and constellations, etc. In the exemplary system of FIG. 1, the gateways 106 and 108 also control the assignment of particular satellites to user terminals. As a user terminal transitions from one geographic coverage area to another geographic coverage area, a handoff occurs from one satellite beam to another satellite beam or from one satellite to another in order to provide continued user terminal coverage.

Figure 2:
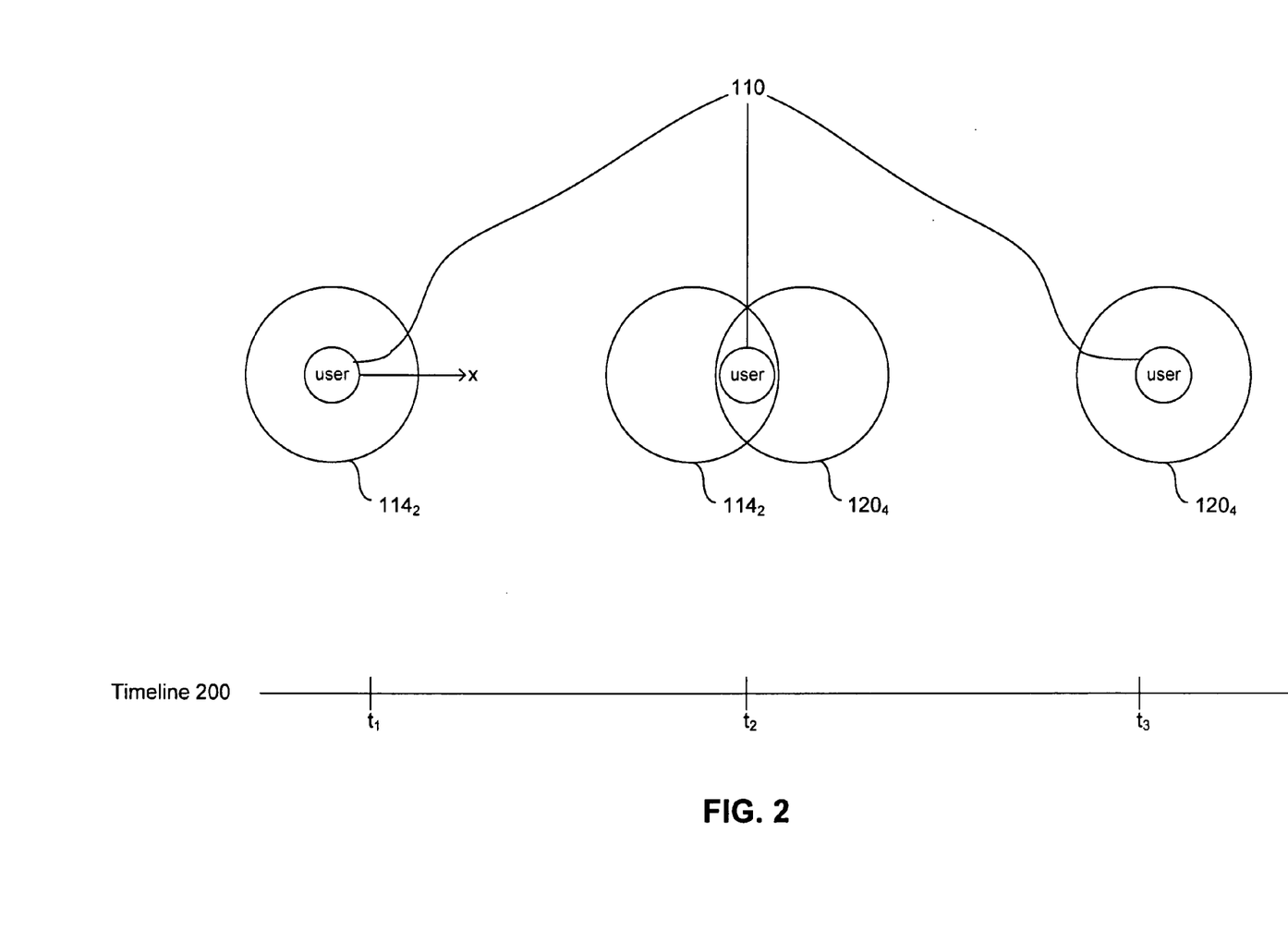
FIG. 2 is an illustration depicting a user terminal soft handoff from one satellite to another satellite in the system of FIG. 1.

FIG. 2 illustrates the process of a user being handed off from one satellite beam to another satellite beam. In FIG. 2, the portable user terminal 110 travels along a timeline 200. At time $t_1$, the terminal 110 is within the coverage area of a servicing satellite beam B114. As the terminal 110 proceeds along a direction x, at time $t_2$ the user terminal 110 will be positioned within the coverage area of both the satellite beam $B114_2$ of the satellite 102 as well as within a destination satellite beam $B120_4$ of the satellite 104. Here, before a servicing gateway, such as the gateway 106, can transfer messages and calls to the terminal 110, the terminal 110 must communicate to the gateway 106 an accurate identification of the satellite beams B114 and B120. In an exemplary embodiment, individual satellites may include up to 16 or more satellite beams at each frequency in a given footprint. Thus, each satellite may provide communications links to users on any one of the 16 different satellite beams, as shown in FIG. 3.

Figure 3:
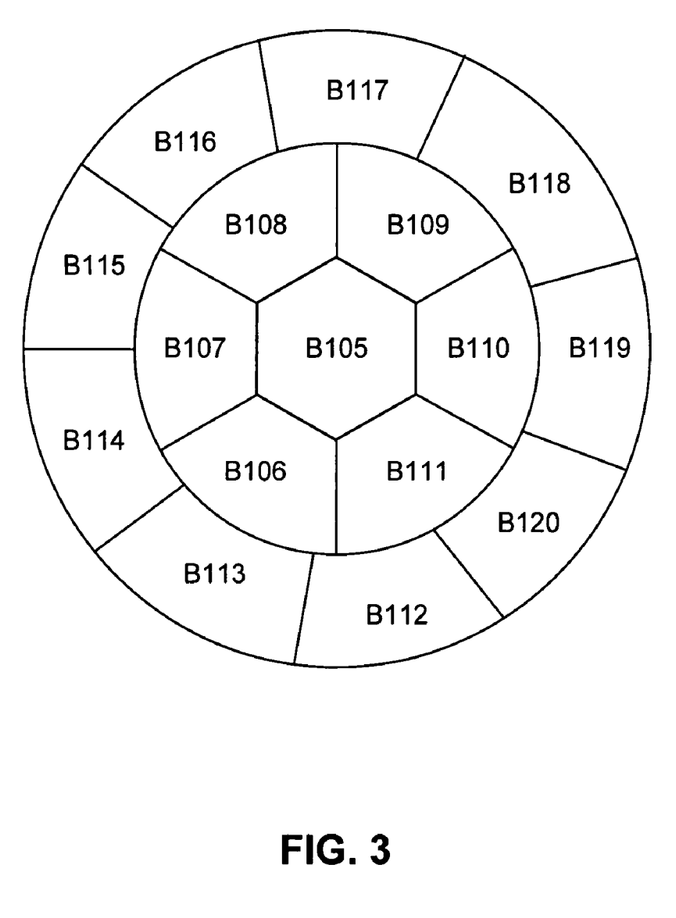
FIG. 3 is a diagram depicting the format of one satellite beam pattern or footprint in the system of FIG. 1.

In FIG. 3, an exemplary coverage area or footprint of one satellite is shown. That is, the footprints for each of the satellites 102 and 104 includes individual satellite beams B105-B120, each having its own position or pattern within the footprint. Among the footprints are the satellite beams B112, B114, B116, and B118-120 shown in FIG. 1. Also, as discussed in greater detail below, different satellites may share the same or similar beam configurations and beam identification numbers. Individual beams within the same satellite may be distinguished from one another on the basis of their PN code offsets, as discussed above. Beams from adjacent satellites may be distinguished from one another on the basis of the different PN polynomials, as discussed above. Different PN offsets can also be used to distinguish beams from adjacent satellites that have the same beam ID number in some systems such as where parameters of the PN sequences, such as length etc. are different.

Figure 4:
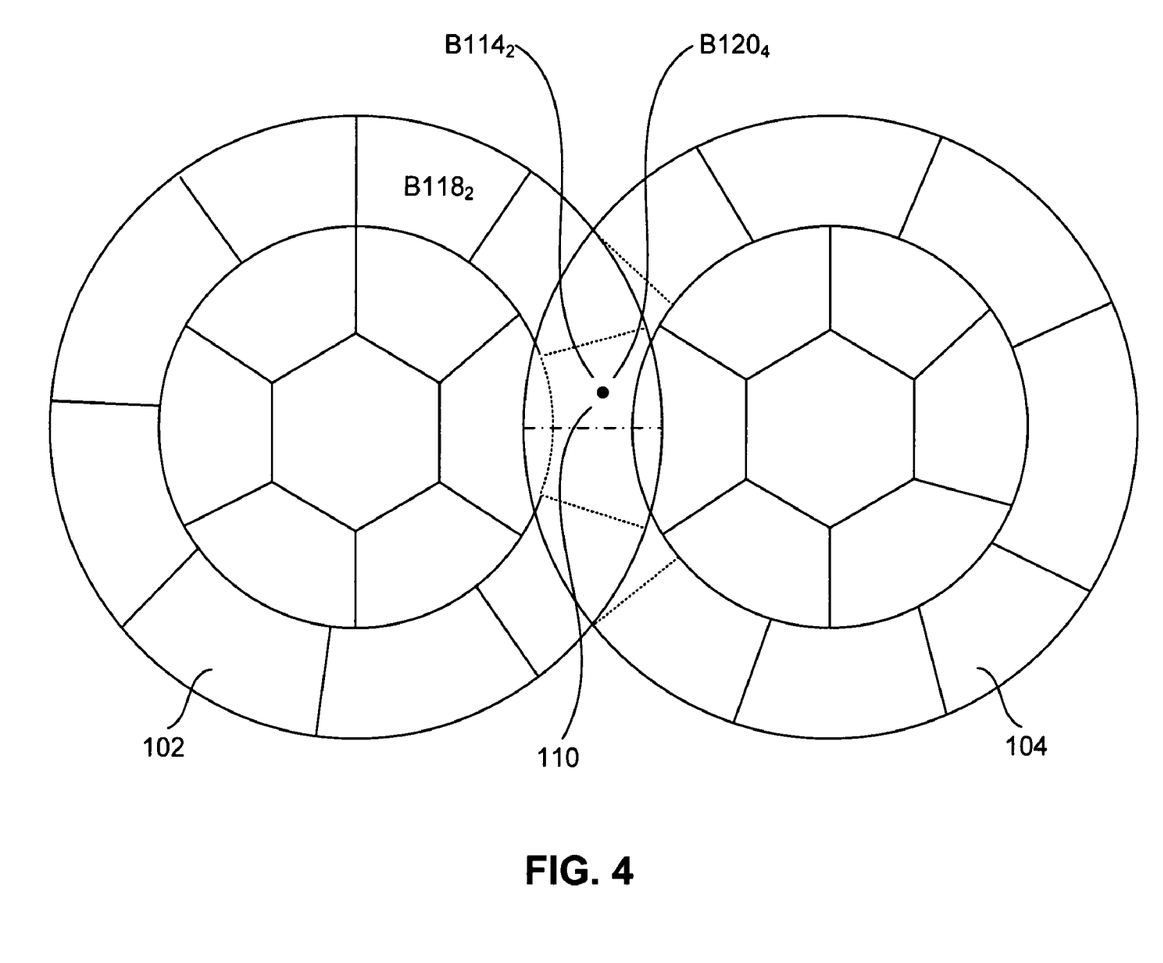
FIG. 4 depicts a user within the coverage area of two satellite footprints in the system of FIG. 1.

FIG. 4 provides a more detailed illustration of the user terminal 110 positioned within the coverage areas of the satellite beams $B114_2$ and $B120_4$. In FIG. 4, the terminal 110 must be able to clearly identify the destination beam $B120_4$. Although similar pilot signals are used by the beams $B114_2$ and $B120_4$ these beams differ in their associated PN offsets and/or PN polynomials, plus some unknown propagation delay. Referring back to FIG. 3, each of the satellite beams B105-B120 has a unique PN offset which corresponds to a common timing sequence shared by the beams. Specifically, in the exemplary communications system of FIG. 1, the difference in timing (code offsets) between individual satellite beams is about 15 milliseconds (ms). Therefore, propagation delays near or exceeding 15 ms may prevent accurate measurement of the PN offset by the user terminal 110. As a result, a misidentification of the satellite beam $B120_4$ may occur. The PN phase offset associated with one satellite beam is closely correlated to its beam ID. Additionally, other factors, such as elevation angle and differences in antenna gain, can also contribute to the degree of error in accurately identifying associated satellite beams.

Figure 5:
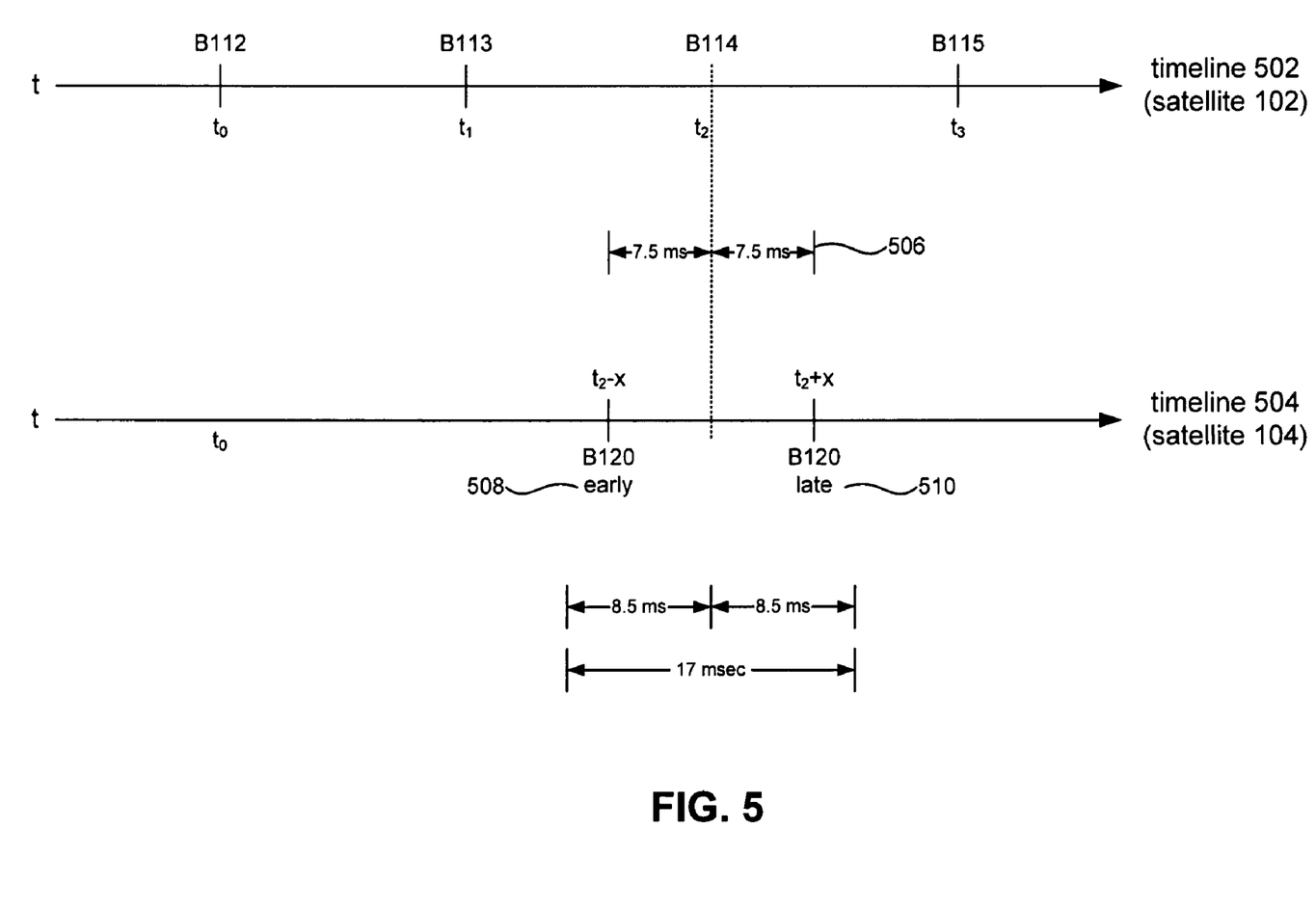
FIG. 5 is a timing diagram depicting beam identification errors resulting from propagation delays.

FIG. 5 illustrates the impact the propagation delay between satellites may have on identification of satellite beams. In FIG. 5, relative timing associated with each of the satellites 102 and 104 is illustrated along respective timelines 502 and 504 for comparison. As discussed above, beams from the same satellite have similar pilot signals, although each of the signals has a different PN offset in the present exemplary embodiment. Satellite beams from adjacent satellites, however, are distinguished from one another by time of arrival differences measured at the user terminal and caused by propagation delay between the satellites.

The timeline 502 depicts a timing relationship between satellite beams $B112_2$-$B115_2$ of the satellite 102. Timeline 504 illustrates a potential timing relationship between beam $B120_4$ of the satellite 104 and the beam $B114_2$ of the satellite 102. As shown, a small timing error 506 may be tolerated in this timing relationship. The small timing error 506 is roughly equal to the maximum expected propagation delay between the satellites. This delay is about plus or minus 7.5 ms. Propagation delays larger than this amount, however, may translate to PN code offset measurement errors and ultimately lead to misidentification of the associated satellite beam.

For purposes of illustration, the satellite beam $B114_2$ from satellite 102 is shown to arrive at the user terminal 110 at time $t_2$ along the timeline 502. However, the beam $B120_4$ from the satellite 104, shown along timeline 504, may arrive at the user terminal 110 before or after the arrival of beam $B114_2$ from the satellite 102. That is, the beam $B120_4$ from the satellite 104 may occur earlier than $t_2$ of timeline 502 by an amount equal to $t_2$-x, or may occur at some point later, up to an amount $t_2$+x due to propagation delay. Therefore, the propagation delay as illustrated in FIG. 5, is plus or minus about 8.5 ms. The separation between adjacent beams is only about 15 ms in the exemplary communications system 100. Therefore, delays near or greater than about 15 ms will introduce errors in the PN offset measurements. The propagation delay of plus or minus 8.5 ms, illustrated in FIG. 5, represents a 17 ms delay that may introduce PN offset measurement errors. Consequently, the user terminal 110 will misidentify the satellite beam $B114_2$ of the destination satellite 104. The significance of this misidentification is illustrated more clearly in FIGS. 6 and 7.

Figure 6:
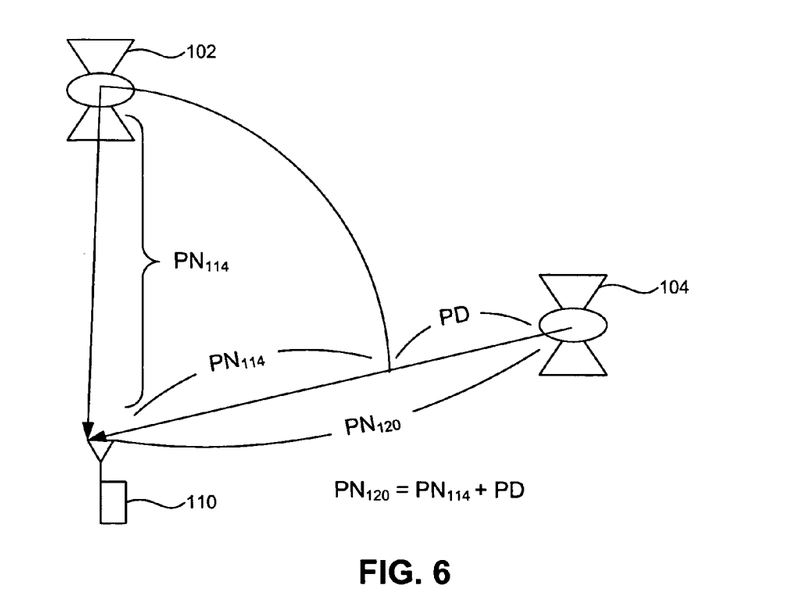
FIG. 6 is a diagram depicting typical satellite terminal location determination.

FIG. 6 depicts a timing relationship between the user terminal 110, the servicing satellite 102, and the destination satellite 104. In particular, FIG. 6 shows a relationship between a phase offset $PN_{114}$ of the satellite beam $B114_2$ and a phase offset $PN_{120}$ of the satellite beam $B120_4$. As noted above, PN offsets from different beams of the same satellites are related based upon the beam ID. PN offsets from beams of different satellites are similarly related. In FIG. 6, for example, $PN_{120}$ is a function of the offset $PN_{114}$ plus the expected maximum propagation delay, PD, between the user terminal 110 and the destination satellite 104. However, if the actual propagation delay is different from the expected maximum propagation delay PD by more than the value 506, $PN_{120}$ may not be accurately determined. User terminals search for PN offsets of destination satellite beams by searching a window of available PN offset values (all possible offsets). Such search techniques are well known in the art. These techniques, however, are not fail-safe, and may ultimately produce the positioning or identification errors.

Figure 7:
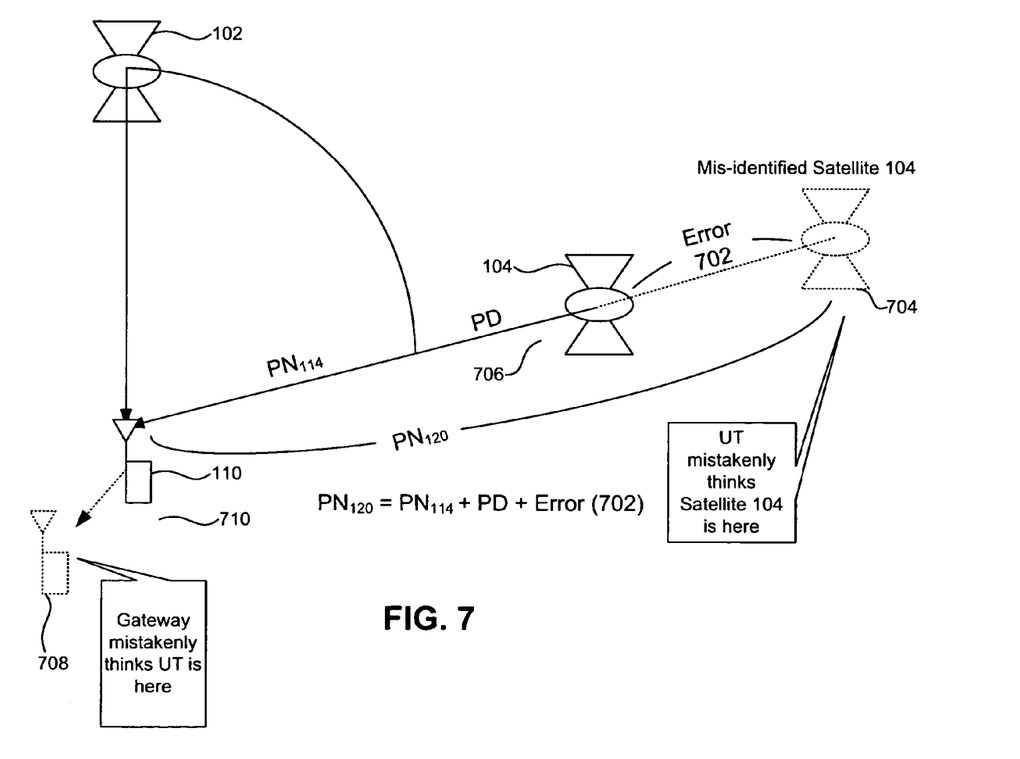
FIG. 7 is a diagram depicting user terminal location errors resulting from the propagation delays shown in FIG. 5.

FIG. 7 illustrates the impact of an erroneous PN code offset measurement. In FIG. 7, an error by the user terminal 110 in measuring the propagation delay PD, may produce an error 702. The error 702 may ultimately lead the gateway 106 to believe the satellite 104 is positioned at an incorrect location 704 instead of its actual location 706. The gateway 106 may also believe that the user terminal 110 is located at an incorrect position 708 instead of its actual position 710 and as a result, may assign improper services or terminate access by the user terminal 110. Thus, using conventional techniques, the user terminal 110 will not recognize that $PN_{120}$, the sum of $PN_{114}$ and the PD, also includes the error 702. This is particularly significant if the error 702 exceeds the expected timing between the satellite beams of the same satellite.

The present invention provides the user terminal 110 with the ability to independently verify the PN code phase offset measurement of a destination satellite beam. This independent verification may establish more reliable communication links between user terminals and the gateways of the exemplary communication system 100.

Figure 8:
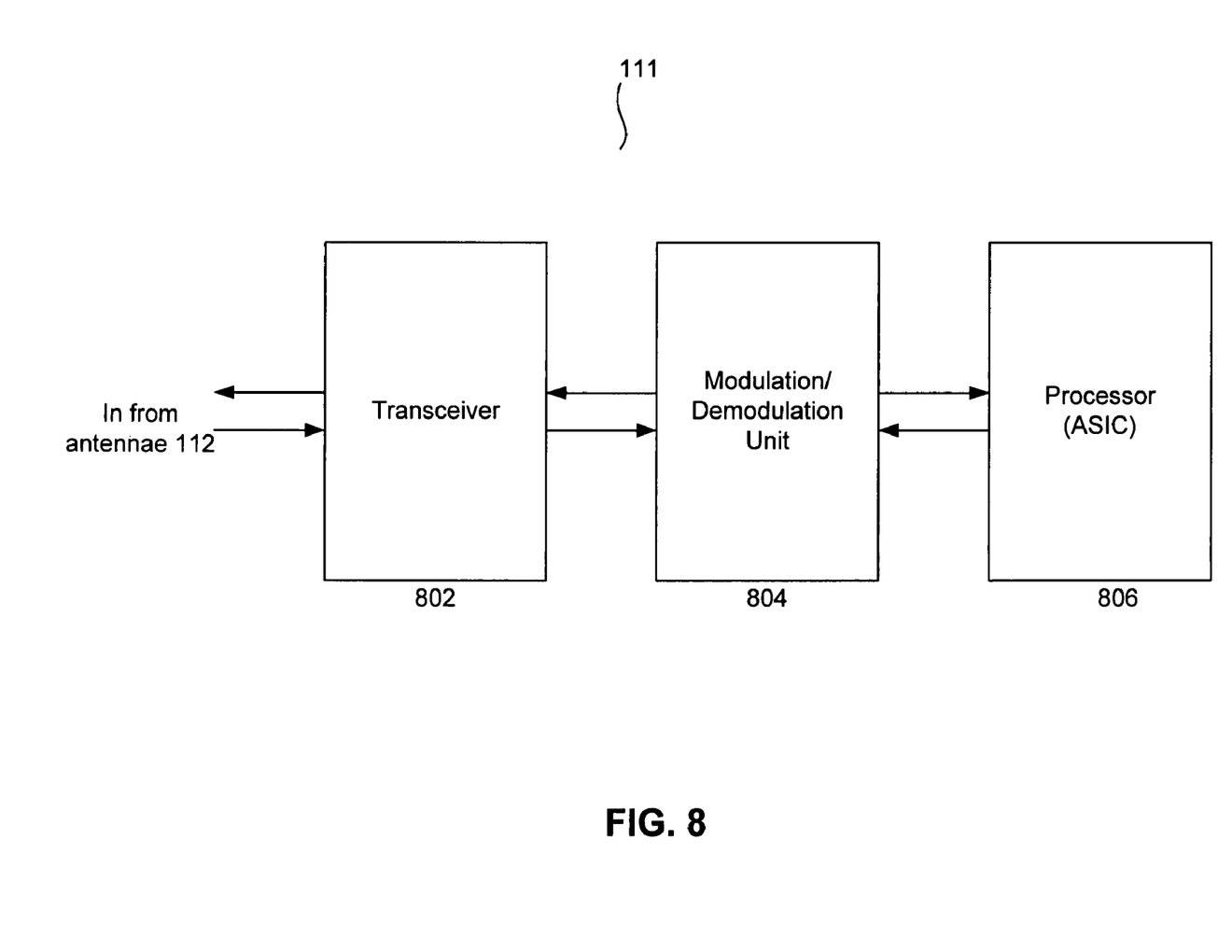
FIG. 8 is a block diagram of a user terminal constructed and arranged in accordance with the present invention.

As shown in FIG. 8, the communications unit 111 includes a transceiver 802 for transmitting and receiving signals through the antenna 109, and a modulation/demodulation unit 804 for performing modulation and demodulation of the transmissions and received signals respectively. A processor 806, is electrically connected with the communications unit 111 to process the signals. The processor 806 may include well known standard elements or generalized function or general purpose hardware including a variety of programmable electronic devices, or computers that operate under the control of commands, firmware, or software instructions to perform the desired functions. Examples include a software-controlled controller, a microprocessor, one or more digital signal processors (DSP), dedicated function circuit modules, and application specific integrated circuits (ASICs). When a user terminal initially acquires a servicing satellite and is then later handed off to a destination satellite, a method or process shown in FIG. 9 is executed in the processor 806 to independently verify the PN offset measurement of the destination satellite.

Figure 9:
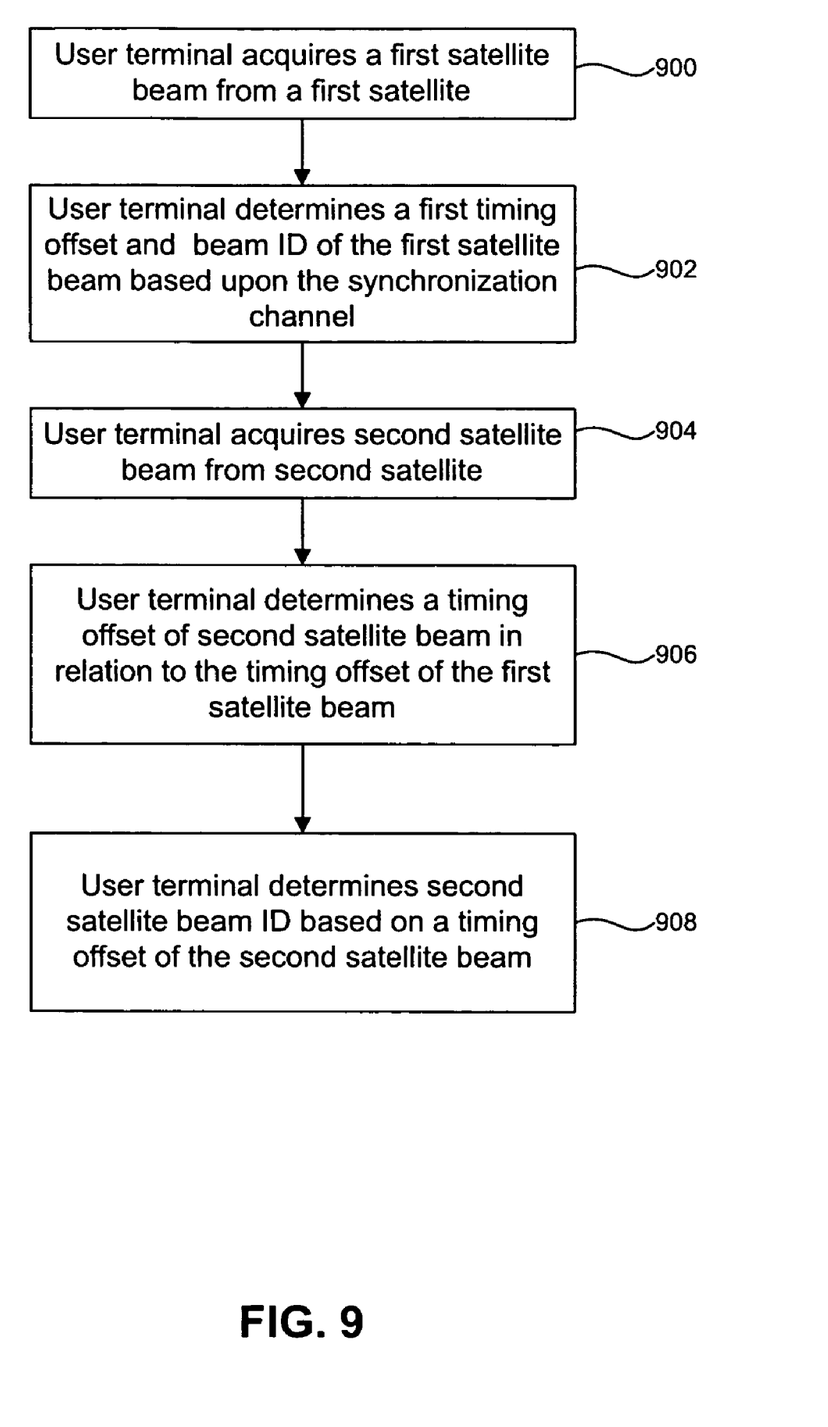
FIG. 9 is a flowchart depicting a method for determining timing offsets associated with first and second satellite beams from respective satellites.

In FIG. 9, the user terminal 110 establishes a communications link using the exemplary communications system 100. Thus, the terminal 110 initially acquires the satellite beam $B114_2$ from the satellite 102, as shown in step 900. The pilot signal, acting as a beacon, notifies the user terminal 110 of the presence of the satellite beam B120. Since the user terminal 110 may be within the coverage area of other satellite beams, the user terminal 110 measures the signal strength of all received pilot signals to insure connection with the strongest beam of the closest satellite. When a pilot signal is received having a signal strength greater than a predetermined value, the pilot signal is transferred from the receiver 802 to the demodulator 804, where demodulation is performed.

Once the user terminal 110 successfully acquires the pilot signal from the satellite 102 and is consequently permitted to demodulate the synchronization channel, the user terminal 110 determines the PN code offset of the acquired pilot signal. The PN offset is representative of the beam ID, as indicated in step 902. In the present exemplary embodiment, the user terminal 110 now knows that it has acquired the satellite beam $B114_2$ of the satellite 102. As long as the user terminal 110 remains active, it will not need to demodulate the CDMA synchronization channel again. Thus, demodulation of the pilot channel and the synchronization channel need only occur once during any particular communications session for a given user terminal. During this one session, the user terminal 110 is notified of the satellite beam ID.

Knowledge of the satellite beam ID is critical because it is the key by which the associated gateway provides the user terminal access to the paging channel. The paging channel is a vehicle by which other communication-associated messages and paging information is forwarded to the user terminal. Therefore, access to the paging channel is required if the user terminal 110 is to maintain its communications links.

Eventually, the servicing or communication link for user terminal 110 will be transferred in a hand-off procedure from the current servicing satellite beam B114$_2$ to a target or new destination satellite beam, as shown in FIG. 2 and described in step 904 of FIG. 9. When the user terminal 110 initially receives a new pilot signal associated with a potential destination satellite beam, it initially has no way of knowing the associated beam ID. To determine the beam ID, the user terminal 110 must first determine the PN offset of the new beam, as described in step 906. To determine the PN offset of the new pilot signal, the user terminal 110 searches the window of all available PN phase offset values (all possible offsets), which may be stored within a memory (not shown) of the processor 806. To perform this search, the user terminal 110 will use the PN offset of the servicing satellite beam B114$_2$ as a point of reference. As illustrated more clearly in FIG. 6, the PN offset value of the destination satellite beam PN$_{120}$ is the sum of the PN offset value of the servicing satellite beam PN$_{114}$ and the maximum expected propagation delay PD. The user terminal 110 executes this process based upon the standard timing relationships between the satellite beams of the same satellite, as discussed above.

In the exemplary communications system 100, the timing or offsets of pilot signals for adjacent satellite beams within the same satellite are separated by approximately 15 ms. Therefore, when the user terminal 110 searches and finds a pilot signal of a destination satellite beam from a different satellite, it uses the predetermined timing increments and based upon the actual timing separation, a tentative beam ID can be established. This process is depicted in step 908. In the communications system 100, the reference PN timing offset, determined in step 902, is PN$_{114}$ shown in FIG. 6

As stated above, this process accommodates small PN offset errors, such as the error 506 of FIG. 5. Errors of this degree may be less than or equal to the maximum expected propagation delay and are less than the 15 ms beam separation. However, propagation delays that exceed the error value 506 may result in the user terminal 110 incorrectly measuring the PN offsets of newly acquired pilot signals. In the exemplary communication system 100, however, an independent PN offset confirmation technique is used as a verification or validation check to the PN offset determination process of step 906.

The independent confirmation technique uses the Doppler and Doppler rate of change of the satellite 102 currently providing services and the destination or target satellite 104 expected to provide future services, in order to estimate their respective ranges from the user terminal 110. That is, the user terminal 110 is configured to make periodic measurements of the Doppler and Doppler rate of change of the satellite pilot signals. Use of Doppler characteristics provides a method of measurement for signal propagation delays caused by range differences between the satellites and the user terminal 110.

By filtering the Doppler measurements, the user terminal 110 is able to convert the Doppler measurements to a range estimate. A difference between the range estimates is then converted to an estimated PN code offset value. This estimated PN offset value is then compared with the value determined in step 906. If the estimated PN offset value matches, within the expected propagation delay (less than or equal to threshold), the value determined in step 906, the beam ID of the destination satellite beam, determined in step 908, may be confirmed or verified. A more detailed discussion of Doppler and Doppler rate of change determination is provided below, with reference to FIG. 10. One technique for measuring range and range rate in satellites is disclosed in U.S. Pat. No 6,137,441, entitled "Accurate Range And Range Rate Determination In A Satellite Communications System," which is assigned to the assignee of the present invention and is incorporated herein by reference.

Figure 10:
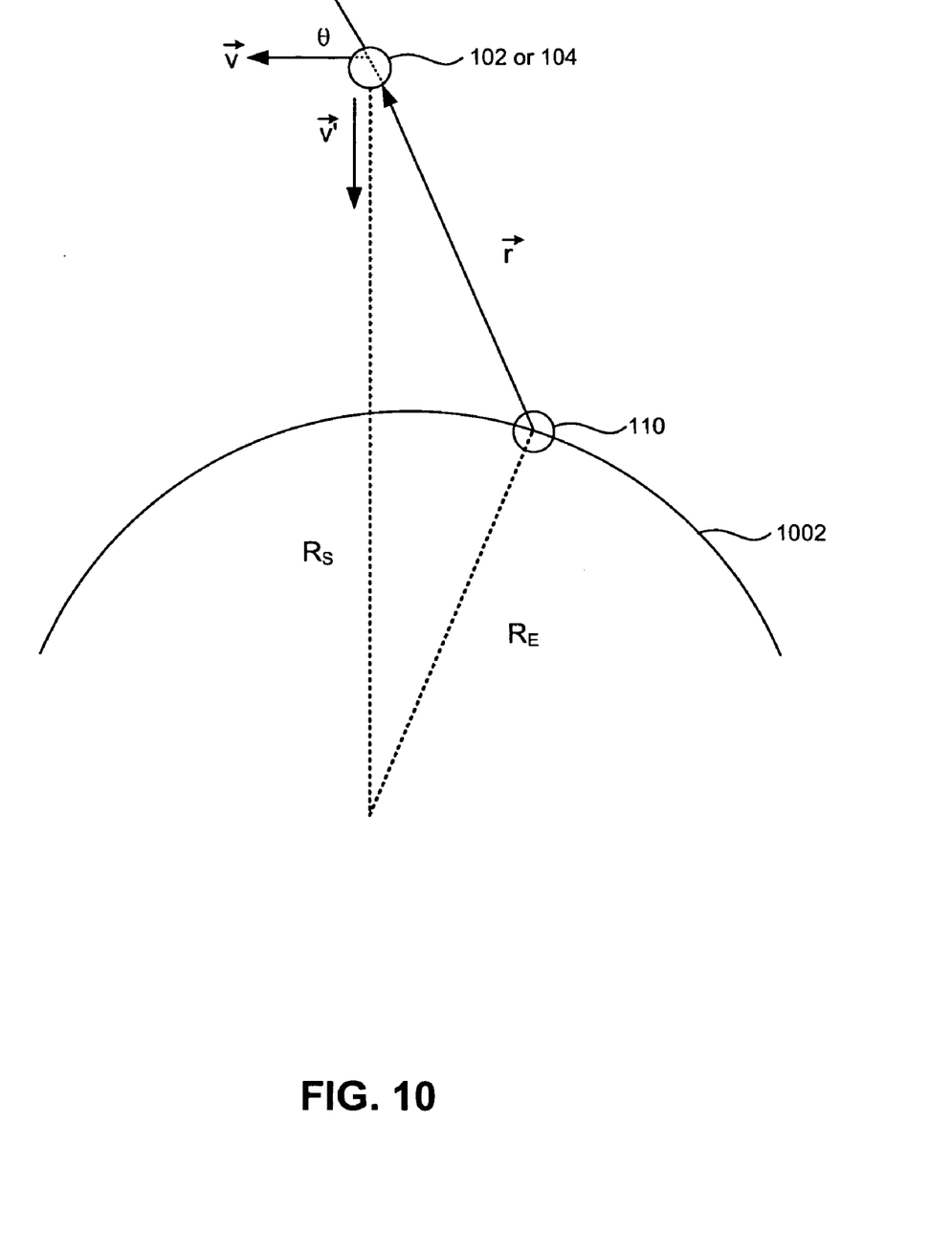
FIG. 10 illustrates the relationship of certain vectors associated with satellites and a user terminal.

FIG. 10 depicts vector relationships that exist between the satellite 102 or 104, and the user terminal 110. Specifically, the user terminal 110 will measure the Doppler shift and Doppler rate of change of the satellite beams. Before discussing this process, several relevant known quantities are shown in Table 1.

TABLE 1

Constants

| Constant | Value | Description |
|---|---|---|
| F | 2.49 * 10$^9$ Hz | Forward link frequency |
| c | 2.998 * 10$^8$ m/s | Speed of light |
| v | 7.152 * 10$^3$ m/s | Satellite velocity |
| R$_E$ | 6.378 * 10$^6$ m | Earth radius |
| R$_H$ | 1.414 * 10$^6$ m | Satellite elevation |
| R$_S$ | 7.792 * 10$^6$ m | Satellite orbit radius, R$_E$ + R$_H$ |

The idea of the diagram of FIG. 10 is that satellite 102 or 104 orbit the Earth 1002 in a near circular orbit. Although the Earth has an irregular shape and is, therefore, not completely round, this irregularity can be ignored for purposes of measuring Doppler characteristics. In FIG. 10, the vector v represents the velocity of a satellite, the vector v' represents acceleration of the satellite, and the vector r represents a direction vector pointing from the user terminal 110 to a satellite 102 or 104. An angle θ is formed between the velocity vector v and a satellite range vector r.

The goal is to calculate the length of the direction vector R=|r|, which is also defined as the range from the satellites 102/104 to the user terminal 110. The user terminal 110 must also determine how fast the range R changes, which is known as the range rate R'. The range rate R' is given by the expression:

$$R' = \frac{v \cdot r}{R} \quad (1)$$

Using the above definition of R', and taking the derivative of both sides of equation (1) yields a range acceleration value, which is expressed by:

$$R'' = \frac{v' \cdot r}{R} + \frac{v \cdot r'}{R} - \frac{v \cdot rR'}{R^2} \quad (2)$$

where v' is the acceleration of the satellites, a function of the earth's gravitational force, and r' is equal to the satellites' velocity.

Next, each of the three terms of equation (2) can be rewritten as:

$$\frac{v' \cdot r}{R} \rightarrow v' = \frac{v^2}{R_s} \text{ toward the center of the Earth; see FIG.10}$$

$$= -\frac{v^2}{R_s} \sin\theta$$

-continued $$\frac{v \cdot r'}{R} = \frac{v^2}{R}$$

$$\frac{v \cdot rR'}{R^2} = \frac{R'^2}{R}$$

Substituting the above three terms into equation (2) gives, $$R'' = -\frac{v^2}{R_s}\sin\theta + \frac{v^2}{R} - \frac{R'^2}{R} \quad (3)$$

R' can be rewritten and substituted into (3):

$$R' = \frac{v \cdot r}{R} = \frac{vR}{R}\cos\theta = v\cos\theta \quad (4)$$

Thus, the range acceleration R" becomes $$R'' = -\frac{v^2}{R_s}\sin\theta + \frac{v^2}{R}(1 - \cos^2\theta) \quad (5)$$

$$= -\frac{v^2}{R_s}\sin\theta + \frac{v^2}{R}\sin^2\theta$$

Equation (5) can be rearranged for R, $$R = \frac{v^2 \sin^2\theta}{R'' + \frac{v^2}{R_s}\sin\theta} \quad (6)$$

To solve for R in equation (6), both sin θ and R" are needed. Sin θ is solved by using (1−cos 2 θ); that is, cos θ is related to a known quantity, i.e., Doppler shift. R" is derived from Doppler rate of change, which is another known quantity. Thus, the equations can be rewritten with Doppler denoted as f:

$$f = F\frac{v}{c}\cos\theta \quad (7)$$

Solving for cos θ, and using sin 2 θ=(1−cos 2 θ), sin 2θ becomes:

$$\sin^2\theta = 1 - \left(\frac{fc}{Fv}\right)^2 \quad (8)$$

Next, the equation (4) may be rearranged as:

$$R' = v\cos\theta = c\frac{f}{F} \quad (9)$$

By taking the derivative of R' with respect to t, R" becomes:

$$R'' = c\frac{f'}{F} \quad (10)$$

f' in equation (10) is df/dt, the Doppler rate of change, which is a quantity that can now be estimated using known techniques. Using equations (8) and (10), R in equation (6) may now be successfully calculated. In the communications system 100, range R will be calculated for both the servicing satellite 102 and the destination satellite 104.

Next, the calculated range R must be converted to an estimated PN code offset value in order to check the PN offset initially determined in step 906. To convert the range R to a PN offset value, the difference in range between the first and second satellites 102 and 104 is divided by the speed of light:

$$PN = \frac{(Range_{104} - Range_{102})}{Speed\ of\ Light} \quad (11)$$

Figure 11:
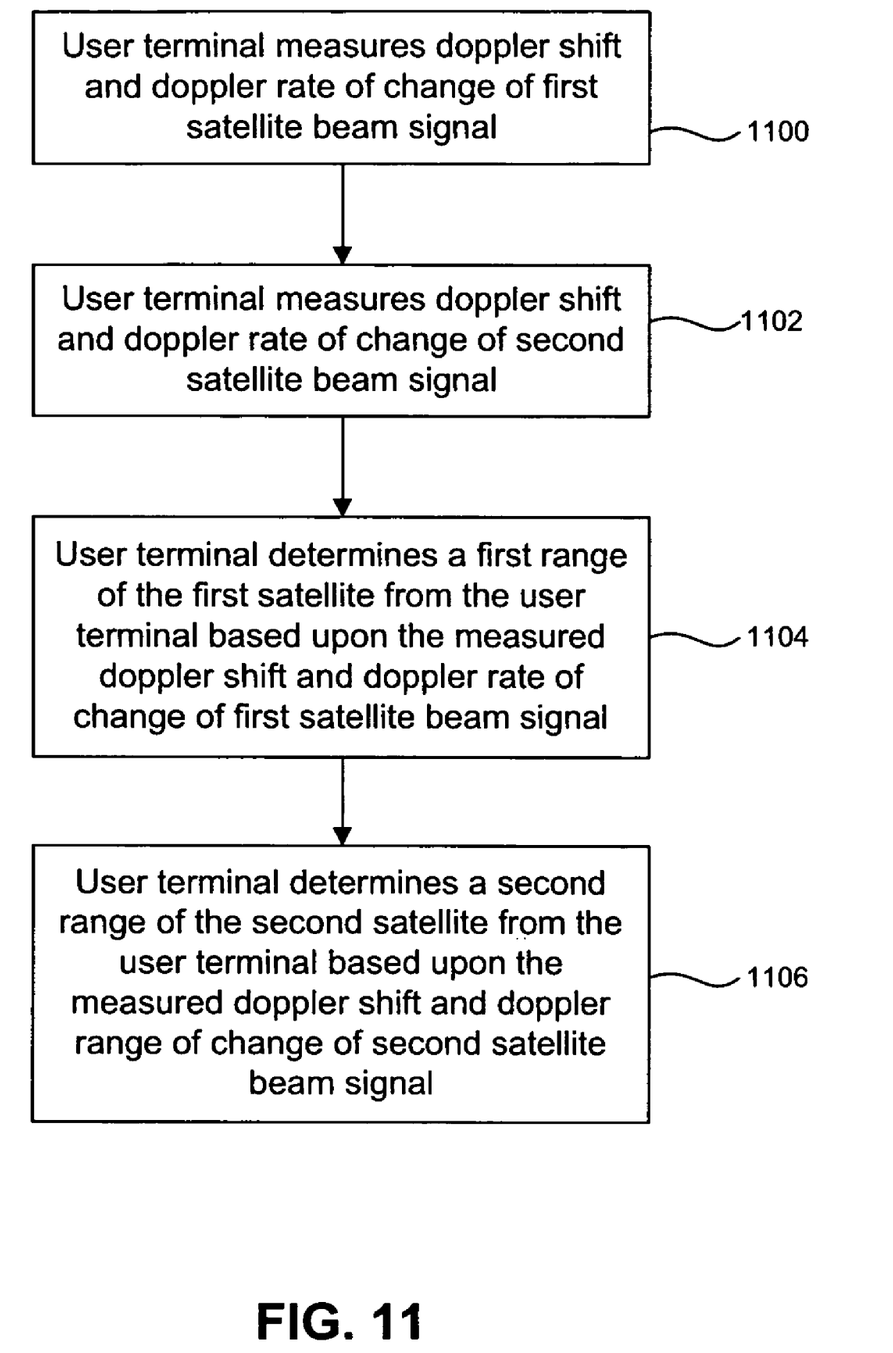
FIG. 11 is a flowchart depicting a method for determining a range from the user terminal to the associated first and second satellites.

An example of this process is described with reference to FIGS. 2, 11, and 12, which depict a process the user terminal 110 follows to check the PN offset initially determined in step 906. First, the processing circuitry or elements (such as an ASIC) within the user terminal 110 must be configured to perform the operations expressed by equations (1)-(11) above. Configured in this manner, the user terminal 110 is able to determine the Doppler shift and the Doppler rate of change of the destination satellite beam $B120_4$, as described in step 1100 of FIG. 11 and shown in FIG. 2. Next, the user terminal 110 measures the Doppler shift and the Doppler rate of change associated with the satellite beam $B114_2$, as described in step 1102. With the Doppler and Doppler rate of change associated with the satellite beams $B114_2$ and $B120_4$ now known, the user terminal 110 may determine the range $R_{104}$ of the satellite 104 from the user terminal 110, as described in the step 1104. Also, the user terminal 110 will determine the range $R_{102}$ of the satellite 102 from the user terminal 110, as described in step 1106.

Figure 12:
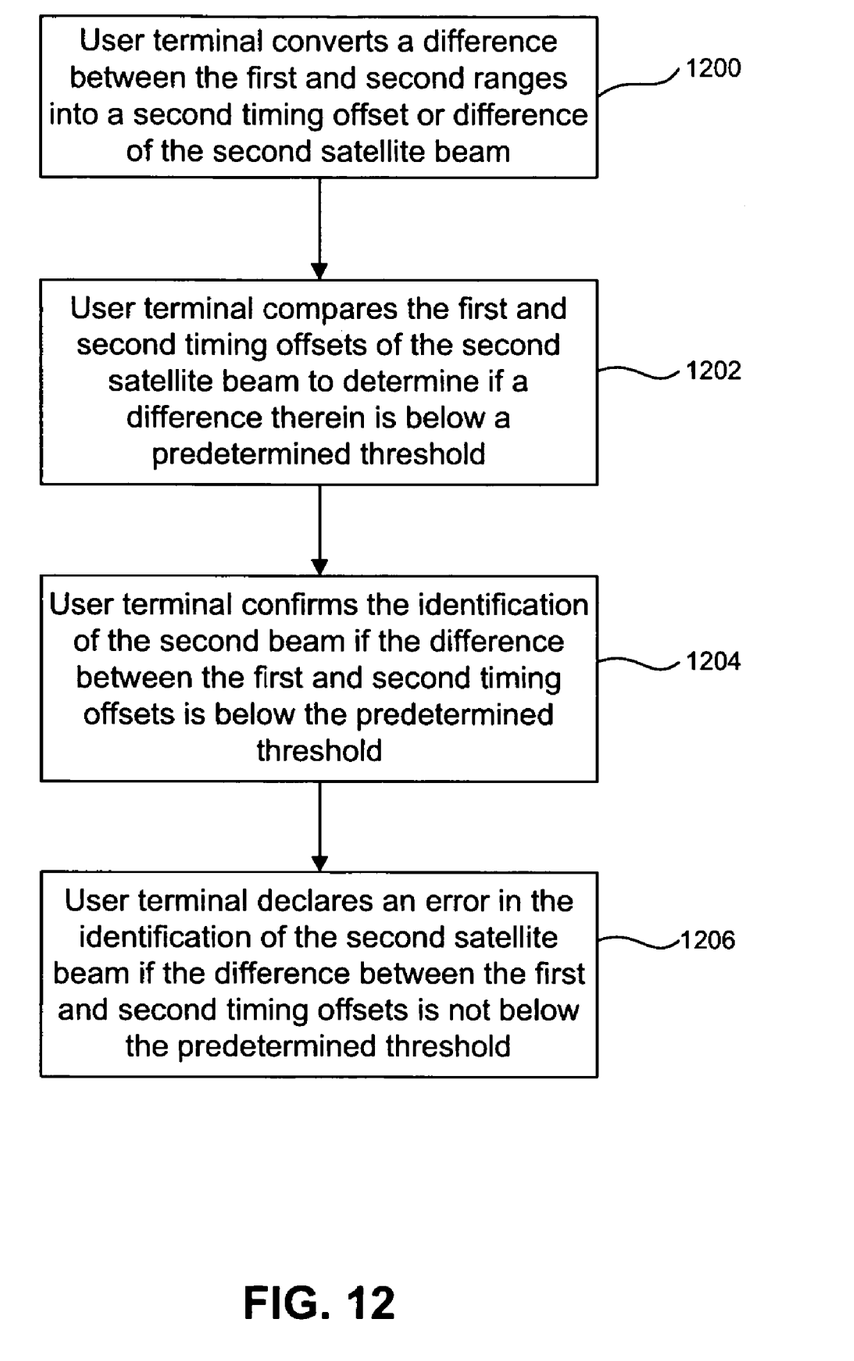
FIG. 12 is a flowchart depicting a method for determining a timing difference associated with the ranges determined in the method of FIG. 10.

In FIG. 12, and as expressed in equation (10), the PN offset of the destination satellite beam $B120_4$ can be derived from the ranges $R_{104}$ and $R_{102}$ determined above. Therefore, as shown in step 1200, the user terminal 110 determines a difference between $R_{104}$ and $R_{102}$ and converts this difference into a PN difference of the pilot signal for the satellite beam $B120_4$. Thus, the user terminal 110 now has an estimated PN difference value, from step 1200, and a determined PN difference value, from step 906. The user terminal 110 may now compare the estimated PN difference with the determined PN difference, as depicted in step 1202.

As depicted in step 1204, if a difference between the determined PN difference and the estimated PN difference is less than a predetermined amount, the user terminal 110 may confirm the earlier identification of the satellite beam $B120_4$ from step 908. In the present exemplary embodiment, the predetermined amount is about 10 ms. An amount of about 10 ms would more than accommodate the maximum expected propagation delay between the satellites 102 and 104, known to be about +/−7.5 ms, as discussed above.

On the other hand, if the estimated PN difference in timing (offset) from step 1200 is greater than the predetermined amount, as depicted in step 1206, the earlier identification of the satellite beam $B120_4$ is considered to be an error, and is therefore discarded. Although an exemplary embodiment of the present invention uses a correlation or search window of about 10 ms in size to determine whether or not the determined PN code offset and the estimated PN code offset match, or are within pre-selected period relative to each other, it is understood in the art that other values or window sizes may be selected, as desired.

An alternative technique is provided for determining range. Here, range can be determined using a quadratic approach, which is expressed as follows:

$$R'' = \frac{v^2 - [R']^2}{R} - GM_E \frac{R_s^2 + R^2 - R_E^2}{2RR_s^3} \quad (12)$$

where, G equals the gravitational constant; and $M_E$ equals the mass of the earth.

This expression can be rearranged to obtain:

$aR^2 + bR + d = 0$, in which
$a = GM_E$;
$b = 2R_s^3 sR''$; and
$d = -(2R_s^3(v^2 - [R']^2) - GM_E(R_s^2 - R_E^2))$ Range information can be obtained using the quadratic expression of equation (12) and simulations have shown that one root is always positive, while the other root is always negative.

By using the technique described above, the user terminal 110 is able to increase the accuracy of identifying destination satellite beams by using a beam ID confirmation technique that compensates for propagation delays between satellites. With the destination satellite beam accurately identified, the user terminal 110 may more reliably access the system resources of the exemplary communications system 100. The present invention, therefore, provides a confirmation, or substantiation, to conventional satellite beam identification techniques.

The foregoing description of the preferred embodiments provides an illustration and description, but is not intended to be exhaustive or to limit the invention to the precise form disclosed. Modifications and variations are possible consistent with the above teachings or may be acquired from practice of the invention. Thus, it is noted that the scope of the invention is defined by the claims and their equivalents.

What is claimed is:

1. A method to determine timing offset errors in a satellite system, comprising:
    (a) determining in a user terminal a first timing offset associated with a first satellite beam from a first satellite;
    (b) determining in the user terminal a second timing offset associated with a second satellite beam from a second satellite based upon the first timing offset;
    (c) estimating a first range from the user terminal to the first satellite;
    (d) estimating a second range from the user terminal to the second satellite; and
    (e) determining an error in the second timing offset based upon a difference between the estimated first and second ranges.

2. The method of claim 1, wherein the first and second timing offsets are pilot signal PN phase offsets.

3. The method of claim 2, wherein the PN phase offsets are associated with a code division multiple access based communications system.

4. The method of claim 1, wherein at least one of (c) and (d) includes determining Doppler characteristics associated with the user terminal and the first and second satellites.

5. The method of claim 4, wherein the Doppler characteristics include Doppler frequency and rate of change of the Doppler frequency.

6. The method of claim 5, wherein the first and second ranges are approximated from the expression:

$$R'' = \frac{v^2 - [R']^2}{R} - GM_E \frac{R_s^2 + R^2 - R_E^2}{2RR_s^3}$$

where, R" is the range acceleration, R' is a range rate, R is the range from user terminal to satellites, $R_E$ is the radius of the Earth, $R_s$ is the satellite orbit radius, v is a velocity vector, G is the gravitational constant, and $M_E$ is the mass of the earth.

7. A method to perform beam identification in a user terminal configured to communicate using a low earth orbit satellite system, the user terminal including a processor configured to (i) receive a first satellite beam including a first timing offset from a servicing satellite, and (ii) facilitate a handoff from the first satellite beam to a second satellite beam, the second satellite beam being radiated from a destination satellite, the method comprising:
    (a) acquiring the second satellite beam in the user terminal;
    (b) determining a second timing offset of the second satellite beam based upon the first timing offset;
    (c) identifying the second satellite beam based upon the second timing offset;
    (d) estimating a first range from the user terminal to the servicing satellite;
    (e) estimating a second range from the user terminal to the destination satellite;
    (f) determining a timing difference based upon a difference between the estimated first range and the estimated second range;
    (g) calculating a difference between the second timing offset and the timing difference; and
    (h) confirming identification of the second satellite beam when the difference between the second timing offset and the timing difference is greater than a predetermined value.

8. The method of claim 7, wherein the predetermined value is user selectable.

9. The method of claim 7, wherein step (g) is accomplished by dividing a difference between the first and second ranges by the speed of light.

10. A method to determine timing offset errors in a communications system, comprising:
    (a) determining in a user terminal a first timing offset associated with a first transmitter signal from a first transmitter;
    (b) determining in the user terminal a second timing offset associated with a second transmitter signal from a second transmitter based upon the first timing offset;
    (c) estimating a first range from the user terminal to the first transmitter;
    (d) estimating a second range from the user terminal to the second transmitter; and
    (e) determining an error in the second timing offset based upon a difference between the estimated first and second ranges.

11. The method of claim 10, wherein the first and second timing offsets are beacon signal phase offsets.

* * * * *